(12) United States Patent
Nagata et al.

(10) Patent No.: US 6,598,904 B2
(45) Date of Patent: Jul. 29, 2003

(54) WEBBING TAKE-UP DEVICE AND VEHICLE

(75) Inventors: Tomonori Nagata, Niwa-gun (JP);
Akira Sumiyashiki, Niwa-gun (JP);
Shinji Mori, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 15 days.

(21) Appl. No.: 09/840,293

(22) Filed: Apr. 24, 2001

(65) Prior Publication Data

US 2001/0050474 A1 Dec. 13, 2001

(30) Foreign Application Priority Data

Apr. 24, 2000 (JP) ........................................ 2000-123159

(51) Int. Cl.[7] .............................................. B60R 22/34
(52) U.S. Cl. ................... 280/807; 280/805; 280/806; 280/801.1; 280/802; 242/379.1; 297/474
(58) Field of Search ............................... 280/805, 806, 280/807, 801.1, 735, 802; 242/379.1; 297/468, 474, 476, 479

(56) References Cited

U.S. PATENT DOCUMENTS

| | | | | |
|---|---|---|---|---|
| 4,036,322 A | * | 7/1977 | Takada et al. | 180/268 |
| 4,323,205 A | * | 4/1982 | Tsuge et al. | 242/379.1 |
| 5,337,970 A | * | 8/1994 | Imai et al. | 242/374 |
| 5,779,176 A | * | 7/1998 | Hori et al. | 242/379.1 |
| 5,788,177 A | | 8/1998 | Keller et al. | |
| 5,938,135 A | * | 8/1999 | Sasaki et al. | 242/374 |
| 5,954,287 A | * | 9/1999 | Hirase | 242/379.1 |
| 5,967,442 A | * | 10/1999 | Wier | 242/379.1 |
| 6,047,914 A | * | 4/2000 | Sasaki | 242/379.1 |
| 6,131,843 A | * | 10/2000 | Singer et al. | 242/379.1 |
| 6,206,316 B1 | * | 3/2001 | Kielwein et al. | 242/379.1 |
| 6,216,972 B1 | * | 4/2001 | Rohrle | 242/379.1 |
| 6,302,346 B1 | * | 10/2001 | Brown et al. | 242/371 |
| 6,343,759 B1 | * | 2/2002 | Specht | 242/374 |
| 6,354,529 B1 | * | 3/2002 | Asagiri et al. | 242/379 |
| 6,360,980 B1 | * | 3/2002 | Lee | 242/379.1 |
| 6,481,660 B2 | * | 11/2002 | Nagata et al. | 242/379.1 |

FOREIGN PATENT DOCUMENTS

| | | |
|---|---|---|
| EP | 0 791 513 | 8/1988 |
| EP | 0 888 939 | 1/1999 |
| EP | 1 031 474 | 8/2000 |
| JP | 405254391 A * | 10/1993 |
| JP | 2000-85527 | 3/2000 |
| WO | WO 97 02162 | 1/1997 |

OTHER PUBLICATIONS

*European Search Report*, Sep. 25, 2002.

* cited by examiner

*Primary Examiner*—Paul N. Dickson
*Assistant Examiner*—Deanne Draper
(74) *Attorney, Agent, or Firm*—Nixon Peabody LLP; Thomas W. Cole

(57) ABSTRACT

A webbing take-up device and a vehicle are provided in which different force limiter loads can be selected at arbitrary times with a simple structure. A wire is inserted into a spool. One end portion of the wire is fixed to a lock base. Thus, when rotation of the lock base is impeded, a twisting load of a torsion bar and a drawing-through load of the wire are applied to a webbing as force limiter load. Further, a cutting gear is disposed between the spool and the lock base. When the cutting gear is rotated at an arbitrary time, the wire is cut. In this way, the force limiter load is reduced to only the twisting load of the torsion bar. As a result, different force limiter loads can be selected at arbitrary times with a simple structure.

11 Claims, 6 Drawing Sheets

F I G. 4
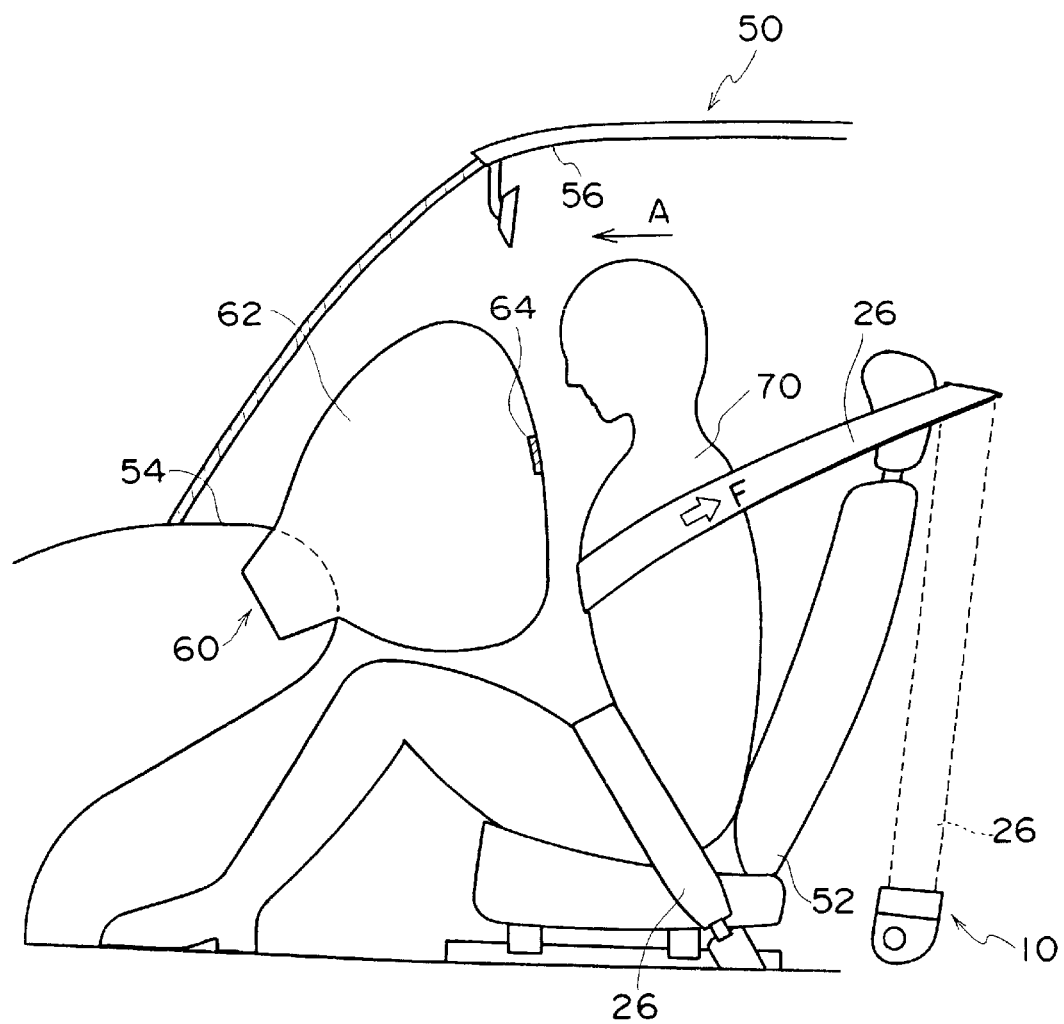

WEBBING TAKE-UP DEVICE AND VEHICLE

BACKGROUND OF THE INVENTION

1. Field of the Invention

The present invention relates to a webbing take-up device which tenses a webbing in a direction of restraining a vehicle occupant at the time of rapid deceleration of a vehicle, and in particular, to a webbing take-up device which, at the time of impeding pulling-out of a webbing, can absorb energy while allowing the webbing to be pulled-out.

Further, the present invention relates to a vehicle equipped with this webbing take-up device.

2. Description of the Related Art

In a webbing take-up device, at the time of rapid deceleration of a vehicle, rotation of a spool (take-up shaft) in a webbing pull-out direction is locked such that pulling-out of the webbing is impeded. As this locking mechanism, a lock member is provided in a vicinity of a device frame at one end side of the spool. Due to this lock member being operated when the vehicle rapidly decelerates, rotation of the spool in the webbing pull-out direction is hindered.

Further, in such a webbing take-up device, at the time of impeding pulling-out of the webbing, a predetermined amount of pull-out of the webbing is permitted and energy is absorbed. There are devices in which, for example, a spool and a torsion bar disposed coaxially with the spool form the energy absorbing mechanism. Generally, the torsion bar is connected to a lock base and the spool such that the torsion bar and the lock base and the spool do not rotate relative to one another. One end portion of the torsion bar is connected to the spool, and the other end portion of the torsion bar is connected to a lock base to which a lock member is connected. The spool and the lock base usually rotate integrally via the torsion bar. However, at the time of a rapid deceleration of the vehicle, in a state in which rotation of the lock base in the webbing pull-out direction is hindered, the spool rotates in the webbing pull-out direction with respect to the lock base due to the webbing tensile force. At this time, the torsion bar twists, energy is absorbed, and a predetermined amount of rotation of the spool is permitted. The absorbed energy is determined by the product of the load applied to the webbing (the force limiter load) and the webbing pull-out amount (the amount of rotation of the spool). In the webbing take-up device, the force limiter load and the allowed amount of rotation of the spool (the limit of twisting of the torsion bar) are applied.

However, in such a conventional webbing take-up device, the force limiter load at the time of energy absorption is governed by the values of the properties of the material of the torsion bar and the dimensional configuration of the torsion bar. The force limiter load is a fixed value regardless of, for example, the inertial energy of the vehicle occupant such as the collision energy whose parameters are the weight and the physique of the vehicle occupant, the vehicle speed at the time of the collision and the like. Further, the force limiter load is a fixed value from the beginning to the end of energy absorption. Namely, in a conventional webbing take-up device, both during rapid deceleration of the vehicle and during the process of energy absorption, different force limiter loads cannot be selected.

However, if the force limiter load can be reduced (if a small force limiter load can be selected) at an appropriate time in the energy absorbing process, the webbing pull-out amount (the amount of movement of the vehicle occupant) can be suppressed by, at the initial stage of rapid deceleration of the vehicle, applying a large force limiter load so as to make the energy absorption amount per spool rotation amount (webbing pull-out amount) large. On the other hand, after a predetermined energy absorption (after a predetermined amount of energy has been absorbed), by reducing the force limiter load, the load applied to the vehicle occupant can be decreased.

In particular, in a vehicle equipped with an air bag device, by reducing the force limiter load immediately before contact of the air bag and the vehicle occupant, the total load applied to the vehicle occupant can be reduced, and there is less possibility that the vehicle occupant is injured, compared to the conventional device.

A webbing take-up device in which different force limiter loads can be selected in accordance with the inertial energy of the vehicle occupant has been contemplated. However, in order to be able to change the force limiter load in such a conventional webbing take-up device, for example, plural torsion bars are provided and combination of torsion bars which absorbs energy is changed, or torsion bars of different diameters are combined coaxially and the energy absorbing positions thereof are changed. Thus, these structures are complex.

SUMMARY OF THE INVENTION

In view of the aforementioned, a first object of the present invention is to provide a webbing take-up device which, with a simple structure, can select different force limiter loads at arbitrary times.

A second object of the present invention is to provide a vehicle which is equipped with the aforementioned webbing take-up device and an air bag device, and which can reduce the load applied to a vehicle occupant.

In order to achieve the above-described first object, a first aspect of the present invention is a webbing take-up device comprising: a cylindrical spool at which a webbing is taken-up and from which a webbing is pulled-out; a lock base provided at one end side of the spool so as to be coaxial with the spool and so as to be able to rotate relatively to the spool; a locking member which is connected to the lock base and which impedes rotation of the lock base in a direction of pulling out the webbing by engaging with a frame at a time when a predetermined acceleration is sensed; a torsion bar which is provided within the spool coaxially with the spool, one end of the torsion bar being connected to the spool, another end of the torsion bar being connected to the lock base, the torsion bar making the spool and the lock base rotate integrally in a normal state, and a state in which rotation of the lock base in the direction of pulling out the webbing is impeded by the locking member, the torsion bar being twisted due to webbing tensile force while making the spool rotate relatively with respect to the lock base in the direction of pulling out the webbing; at least one wire whose one end portion is fixed to the lock base and whose other end portion and an intermediate portion are inserted in the spool, and due to the at least one wire being pulled out from the spool at a time when the spool rotates relatively with respect to the lock base, the at least one wire generating a resistance force; and a cutting section which is able to cut the at least one wire at an arbitrary time.

The wire of the first aspect may be a rod-shaped member which does not easily deform (e.g., which does not deform by its own weight or due to force which can be applied by a human).

In the webbing take-up device of the first aspect, the spool and the lock base are connected via the torsion bar, and usually the spool and the lock base rotate integrally. Thus, usually, the webbing can be freely taken-up and pulled-out.

When the vehicle rapidly decelerates, the lock member operates to impede rotation of the lock base in the webbing pull-out direction. At this time, the webbing tensile force accompanying the inertial movement of the vehicle occupant is applied, via the spool, to the torsion bar as rotational force in the webbing pull-out direction. As a result, the spool rotates relatively to the lock base while the torsion bar is twisted. Further, when the spool begins to rotate relatively to the lock base, along with this rotation, the wire is pulled out from the spool while being drawn through (rubbed) at an exit portion of the spool, and is taken-up on the side surface of the lock base. In this way, while the twisting load of the torsion bar and the drawing-through (rubbed) load of the wire are applied to the webbing (the vehicle occupant) as a constant force limiter load, the spool rotates in the webbing pull-out direction with respect to the lock base, the webbing is pulled-out, and energy is absorbed.

Moreover, when the cutting section is operated at an arbitrary time in the energy absorbing process, the wire is cut by the cutting section. In this way, only the twisting load of the torsion bar is applied to the webbing as the force limiter load, and the force limiter load can be reduced at an arbitrary time.

Accordingly, at the initial stages of rapid vehicle deceleration, by applying a large force limiter load such that the energy absorbing amount per rotational amount of the spool (webbing pull-out amount) is large, the webbing pull-out amount (amount of movement of the vehicle occupant) can be suppressed. On the other hand, after a predetermined energy absorption, by reducing the force limiter load, the load applied to the vehicle occupant can be reduced.

In a case in which the cutting section is not operated, a large force limiter load is maintained throughout the entire energy absorption process. In a case in which the cutting section is operated immediately after rapid deceleration of the vehicle (for example, at substantially the same time of beginning of the rapid deceleration of the vehicle), a small force limiter load is applied from the initial stages of rapid deceleration of the vehicle. As a result, switching can be carried out between two different force limiter loads in accordance with the inertial energy of the vehicle occupant which is based on the physique of the vehicle occupant and the type of collision.

In this way, in the webbing take-up device relating to the first aspect of the present invention, different force limiter loads can be selected at arbitrary times with a simple structure.

In a webbing take-up device relating to a second aspect of the present invention, the cutting section in the webbing take-up device of the first aspect has: a cutting gear which is formed in a disc shape having meshing teeth at an outer peripheral portion thereof and which has a cutting hole in a disc side surface, the cutting gear being disposed between the spool and the lock base so as to be freely rotatable and so as to be coaxial with the spool, with the at least one wire inserted through the cutting hole; and driving section having driving teeth which can mesh with the meshing teeth of the cutting gear, the driving section usually allowing the cutting gear to rotate freely, and due to the drive means being operated, the drive teeth moving while meshing with the meshing teeth of the cutting gear such that the driving section forcibly rotates the cutting gear with respect to the spool and the lock base.

In the webbing take-up device of the second aspect, a wire is inserted through a cutting hole formed in a disc side surface of a cutting gear provided, so as to be freely rotatable, between the spool and the lock base. One end portion of the wire is fixed to the lock base, whereas the intermediate portion and the other end portion of the wire are inserted into the spool. Thus, usually, the spool and the lock base, which are connected via the torsion bar, and the cutting gear rotate integrally via the wire. As a result, usually, the wire is not cut.

When the driving section is operated at an arbitrary time, due to the driving teeth of the driving section moving while meshing with the meshing teeth of the cutting gear, the cutting gear is forcibly rotated. The cutting gear is set between the spool and the lock base in a state in which the wire is inserted through the cutting hole provided in the disk surface of the cutting gear. Thus, when the cutting gear is rotated forcibly with respect to the spool and the lock base, the wire is cut by the cutting hole provided at the cutting gear.

Accordingly, the force limiter load can be reduced at an arbitrary time.

In this way, in the webbing take-up device of the second aspect, different force limiter loads can be reliably selected (switched) at arbitrary time with a structure that is even more simple.

In order to achieve the above described second object, a third aspect of the present invention is a vehicle comprising: (a) a webbing take-up device having: a cylindrical spool at which a webbing is taken-up and from which a webbing is pulled-out; a lock base provided at one end side of the spool so as to be coaxial with the spool and so as to be able to rotate relatively to the spool; a locking member which is connected to the lock base and which impedes rotation of the lock base in a direction of pulling out the webbing by engaging with a frame at a time when a predetermined acceleration is sensed; a torsion bar which is provided within the spool coaxially with the spool, one end of the torsion bar being connected to the spool, another end of the torsion bar being connected to the lock base, the torsion bar usually making the spool and the lock base rotate integrally, and in a state in which rotation of the lock base in the direction of pulling out the webbing is impeded by the locking member, the torsion bar twisting due to webbing tensile force while making the spool rotate relatively with respect to the lock base in the direction of pulling out the webbing; at least one wire whose one end portion is fixed to the lock base and whose other end portion and an intermediate portion are inserted in the spool, the wire being pulled out from the spool at a time when the spool rotates relatively with respect to the lock base, the at least one wire generating a resistance force; and a cutting section which is able to cut the at least one wire at an arbitrary time; (b) an air bag device; (c) a sensor which can detect information relating to at least one of a vehicle occupant and a state of the vehicle; and (d) control section which is connected to the cutting section and the sensor, and which can operate the cutting section on the basis of detection results of the sensor.

The sensor of the third aspect is not only a sensor which directly senses the distance between the bag body and the vehicle occupant, but also may be an indirect sensor system (program) which can compute the distance between the bag body and the vehicle occupant on the basis of the results of detection of sensor(s) already provided in the vehicle (e.g., a seat load sensor, an acceleration sensor, a webbing take-up amount sensor, or a combination of these sensors).

In the vehicle of the third aspect, for example, the vehicle is provided with the sensor which is able to detect a distance between a bag body of the air bag device and the vehicle occupant, and control section which is connected to the cutting section and the sensor electrically and which can operate the cutting section when it is judged there is a state immediately before contact of the bag body and the vehicle occupant on the basis of detection result of the sensor, when the air bag device is activated, the sensor detects the distance between the bag body and the vehicle occupant, and outputs the results of detection to the control means. When the control means, to which the results of detection of the sensor have been inputted, judges, on the basis of the results of detection, that there is a state immediately before contact of the bag body and the vehicle occupant, the control means operates the cutting section.

In this way, immediately before contact of the bag body and the vehicle occupant, the force limiter load is reduced. Thus, in the state immediately before contact of the bag body and the vehicle occupant, a large force limiter load is applied, the energy absorption amount per time is made large, and the pull-out amount of the webbing (amount of movement of the vehicle occupant) can be suppressed. On the other hand, after contact of the bag body and the vehicle occupant, a smaller force limiter load is applied such that the force applied to the body of the vehicle occupant from the exterior is reduced. In this way, there is less possibility that the vehicle occupant is injured, compared to the conventional device.

In accordance with the physique of the vehicle occupant and the state of the collision, for example, in a case in which the inertial energy of the vehicle occupant is large, it is possible to not operate the cutting section, such that even after contact of the bag body and the vehicle occupant, a large force limiter load may be applied. On the other hand, in a case in which the inertial energy of the vehicle occupant is small, the cutting section can be operated before operation of the air bag device, and a small force limiter load can be applied from before contact of the bag body and the vehicle occupant.

In this way, the vehicle of the third aspect of the present invention is equipped with the above-described webbing take-up device and an air bag device, and the load applied to the vehicle occupant can be reduced.

A fourth aspect of the present invention is a webbing take-up device comprising: a cylindrical spool at which a webbing is taken-up and from which a webbing is pulled-out; a lock base provided at one end side of the spool so as to be coaxial with the spool and so as to be able to rotate relatively to the spool; a locking member which is connected to the lock base and which impedes rotation of the lock base in a direction of pulling out the webbing by engaging with a frame at a time when a predetermined acceleration is sensed; a torsion bar which is provided within the spool coaxially with the spool, one end of the torsion bar being connected to the spool, another end of the torsion bar being connected to the lock base, the torsion bar making the spool and the lock base rotate integrally in a normal state, and in a state in which rotation of the lock base in the direction of pulling out the webbing is impeded by the locking member, the torsion bar being twisted due to webbing tensile force while making the spool rotate relatively with respect to the lock base in the direction of pulling out the webbing; at least one wire whose one end portion is fixed to the lock base and whose other end portion and an intermediate portion are inserted in the spool, and due to the at least one wire being pulled out from the spool at a time when the spool rotates relatively with respect to the lock base, the at least one wire generating a resistance force; and a cutting section which is able to cut the at least one wire at an arbitrary time, wherein the cuffing section has: a cutting gear which is formed in a disc shape having meshing teeth at an outer peripheral portion thereof and which has a cuffing hole in a disc side surface, the cutting gear being disposed between the spool and the lock base so as to be freely rotatable and so as to be coaxial with the spool, with the at least one wire inserted through the cutting hole; and a driving section having driving teeth which can mesh with the meshing teeth of the cutting gear, the driving section allowing the cutting gear to rotate freely in the normal state, and due to the drive means being operated, the drive teeth being moved while meshing with the meshing teeth of the cutting gear such that the driving section forcibly rotates the cutting with respect to the spool and the lock base.

In a fifth aspect of the present invention, in the webbing take-up device of the first or the fourth aspect, the intermediate portion and the other end portion of the wire are accommodated in a wire accommodating portion provided at the spool.

In a sixth aspect of the present invention, in the webbing take-up device of the fifth aspect, the wire accommodating portion is a hole which is substantially parallel to an axis of rotation of the spool.

In a seventh aspect of the present invention, in the webbing take-up device of the fifth aspect, the wire accommodating portion is formed in spiral shape with respect to an axis of rotation of the spool.

In an eighth aspect of the present invention, in the webbing take-up device of the fifth aspect, a plurality of the wires and a plurality of the wire accommodating portions are provided.

In a ninth aspect of the present invention, in the vehicle of the third aspect, the sensor is a sensor which can detect a distance between the vehicle occupant and a bag body of the air bag device.

In a tenth aspect of the present invention, in the vehicle of the third aspect, the sensor is a sensor which can detect at least one of a weight of the vehicle occupant and a physique of the vehicle occupant.

In an eleventh aspect of the present invention, in the vehicle of the third aspect, the sensor detects a running state of the vehicle.

BRIEF DESCRIPTION OF THE DRAWINGS

FIG. 4 is a side sectional view illustrating a portion of a vehicle to which the webbing take-up device relating to the embodiment of the present invention is applied.

DESCRIPTION OF THE PREFERRED EMBODIMENTS

A webbing take-up device 10 relating to an embodiment of the present invention will be described on the basis of FIGS. 1 and 2.

Figure 1:
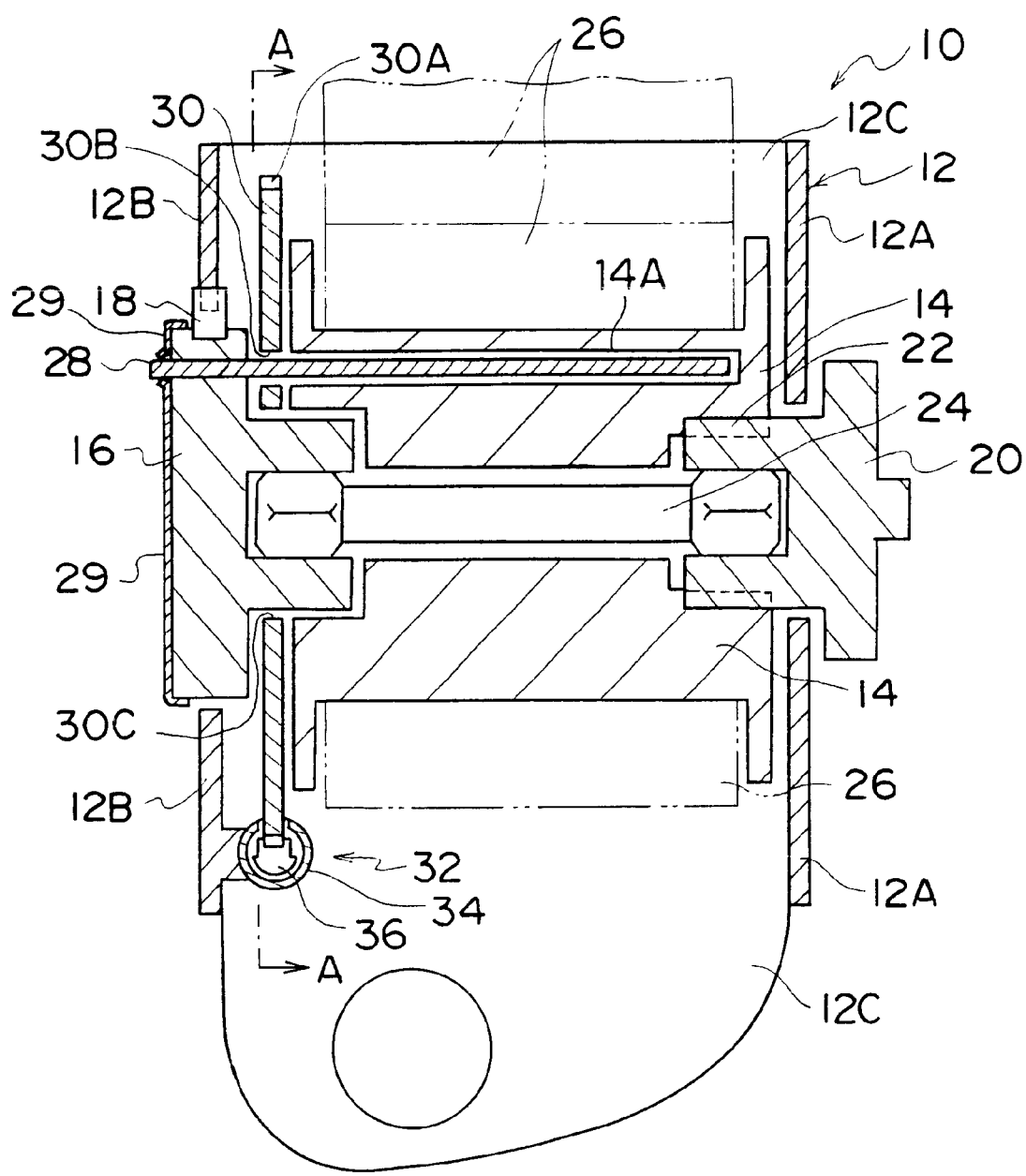
FIG. 1 is cross-sectional view showing an overall structure of a webbing take-up device relating to an embodiment of the present invention.

An overall structure of the webbing take-up device 10 relating to the present embodiment is illustrated in cross-section in FIG. 1. FIG. 2 is a side sectional view of the webbing take-up device 10 as seen from the direction of A—A in FIG. 1.

As shown in FIG. 1, the webbing take-up device 10 has a frame 12. The frame 12 is formed in a substantial U-shape by a pair of opposing leg plates 12A, 12B, and a back plate 12C which connects the leg plates 12A, 12B. The back plate 12C extends downwardly, and the lower end portion thereof is bolted and fixed to a vehicle body.

A cylindrical spool 14, whose axial direction is a direction in which the leg plates 12A, 12B oppose each other, is provided between the opposing leg plates 12A, 12B of the frame 12. One end of a webbing 26 is anchored to the spool 14. Due to rotation of the spool 14, the webbing 26 is freely taken-up or pulled-out with respect to the spool 14.

A lock base 16 is disposed at the leg plate 12B side end portion within the cylinder of the spool 14. The lock base 16 is rotatably supported in an opening of the leg plate 12B of the frame 12, so as to be coaxial with the spool 14. A lock plate 18 serving as a lock member is connected to the lock base 16. In a case in which a predetermined acceleration (deceleration) is sensed by an acceleration sensor (not shown in the drawings), rotation of the lock base 16 is impeded due to the lock plate 18 biting into the leg plate 12B of the frame 12.

A hexagonal portion of a torsion bar 24, which is disposed at an axially central portion within the cylinder of the spool 14, is inserted into the lock base 16. The lock base 16 usually rotates integrally with the hexagonal portion at the one end side of the torsion bar 24.

A sleeve 20 is disposed at the leg plate 12A side end portion within the cylinder of the pool 14. Due to a spline-shaped teeth 22 being fit, the sleeve 20 is connected integrally with the spool 14, and is rotatably supported coaxially with the spool 14 in an opening of the leg plate 12A. The distal end portion of the sleeve 20 projects outward from the leg plate, and a power spring (not shown in the drawings) is provided at the end of this projecting portion. In this way, the sleeve 20 is always urged to rotate in the direction of taking-up the webbing 26.

The sleeve 20 is connected to the lock base 16 by a hexagonal portion at the other end of the torsion bar 24 being inserted into the sleeve 20. The spool 14, the sleeve 20, the torsion bar 24 and the lock base 16 thereby usually rotate integrally.

Here, a cutting gear 30 serving as a cutting section is provided coaxially with the spool 14 between the lock base 16 and the spool 14. A hole 30C is formed in the central portion of the cutting gear 30. A portion of the lock base 16 which is not inserted into the spool 14 is inserted into the hole 30C via, for example, a bearing (not shown in the drawings) or the like. In this way, the cutting gear 30 is rotatably supported with respect to the spool 14 and the lock base 16. Meshing teeth 30A are provided at the outer peripheral portion of the cutting gear 30. A cutting hole 30B is provided at a position in the side surface of the cutting gear 30 which is eccentric from the axis of rotation (The cutting hole 30B is formed so as to be penetrate both sides surface of the cutting gear 30). A wire 28 which is formed in a rod-like shape is inserted into the cutting hole 30B so as to be freely removable therefrom.

One end portion of the wire 28 is inserted through a hole which is formed in the lock base 16 at a position eccentric to the axis of rotation of the lock base 16, and which is parallel to the axis of rotation of the lock base 16. This one end portion of the wire 28 is fixed to the lock base 16 by a push nut 29 which is provided at the leg plate 12B outer side of the lock base 16.

The intermediate portion and the other end portion of the wire 28 are inserted into a hole 14A so as to be freely removable therefrom. The hole 14A is provided in the spool 14 so as to not interfere with the central hole into which the torsion bar 24 and the like are inserted.

In this way, usually, the cutting gear 30 rotates integrally with the spool 14 and the lock base 16 via the wire 28, and the wire 28 is held in a state of being inserted in the hole 14A of the spool 14.

A cutting gear drive device 32 which forms a drive means is provided beneath the cutting gear 30.

The cutting gear drive device 32 is provided with a cylinder 34 which is fixed beneath the cutting gear 30 of the leg plate 12B. As shown in FIG. 2, the cylinder 34 is formed in a cylindrical form at which a portion of the upper portion thereof is open so as to form an opening portion. Some of the meshing teeth 30A of the cutting gear 30 are inserted in the opening portion.

A piston 36 is provided within the cylinder 34 so as to be freely slidable within the cylinder 34. Further, a rack 36A, which can mesh with the meshing teeth 30A of the cutting gear 30, is formed in the piston 36.

A gas supplying device 38 is connected to the cylinder 34. A control device 40 is connected to the gas supplying device 38. The gas supplying device 38 supplies gas to the interior of the cylinder 34 on the basis of a command from the control device 40.

Figure 2:
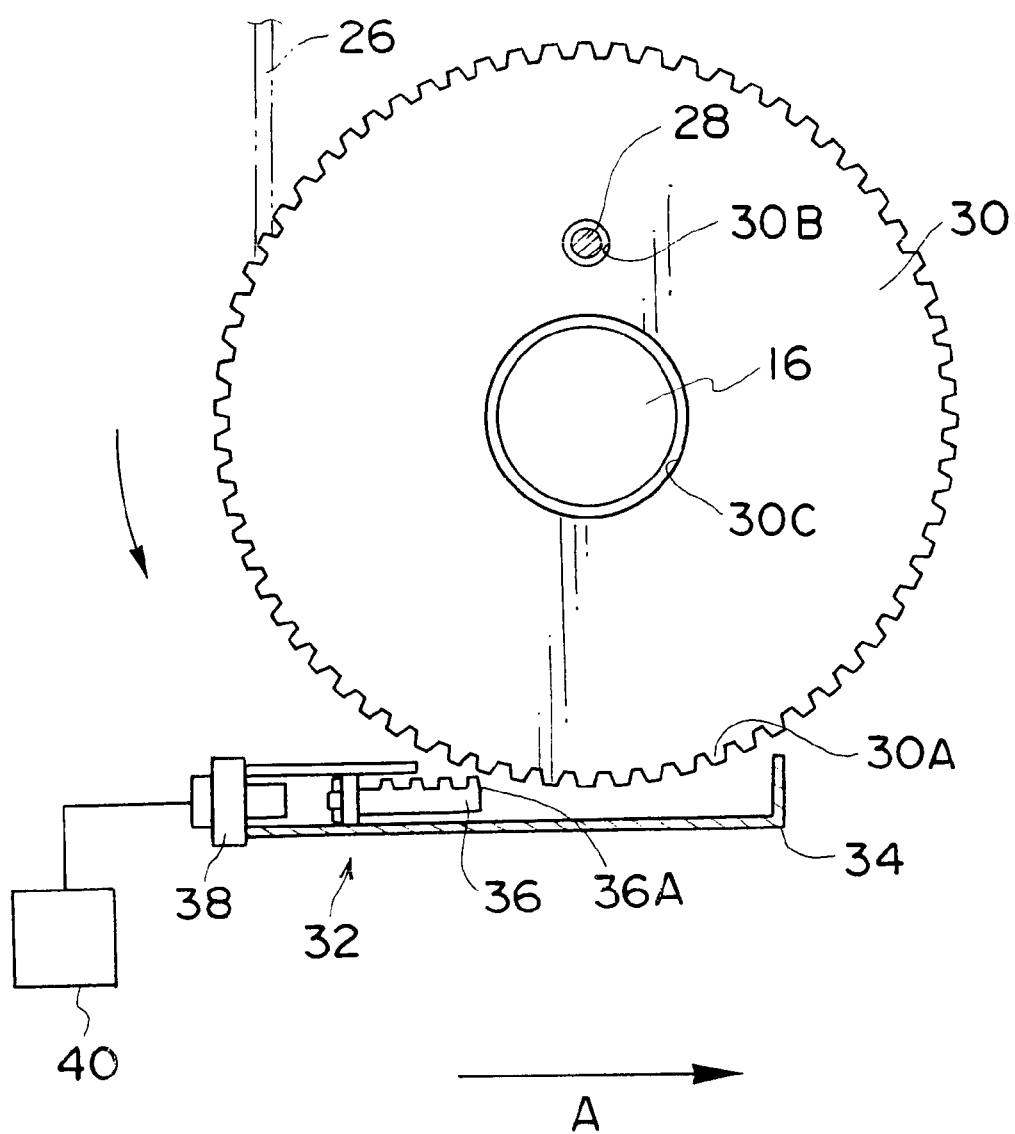
FIG. 2 is a side sectional view, as seen from direction A—A in FIG. 1, which illustrates the webbing take-up device relating to the embodiment of the present invention.

In this way, when the gas supplying device 38 supplies gas into the cylinder 34 on the basis of a command from the control device 40, the piston 36 is slid in the direction of arrow A in FIG. 2 within the cylinder 34 due to this gas pressure. As the piston 36 slides, the rack 36A and the meshing teeth 30A of the cutting gear 30 mesh, and the cutting gear 30 rotates at high speed with respect to the spool 14 and the lock base 16.

Next, operation of the webbing take-up device 10 of the present embodiment will be explained.

In the webbing take-up device 10 having the above-described structure, the spool 14 and the lock base 16 are connected by the torsion bar 24. Thus, usually, these components rotate integrally. Further, the wire 28 is inserted through the cutting hole 30B formed in the side surface of the cutting gear 30 which is provided so as to be freely rotatable. One end portion of the wire 28 is fixed to the lock base 16, whereas the intermediate portion and the other end portion of the wire 28 are inserted into the hole 14A of the spool 14. Thus, usually, the spool 14 and the lock base 16, which are connected via the torsion bar 24, and the cutting gear 30 rotate integrally via the wire 28. As a result, usually, the webbing 26 can be freely taken-up and pulled-out, and the wire 28 is not cut.

In a state of a sudden deceleration of the vehicle, due to the lock plate 18 biting into the leg plate 12B of the frame 12, rotation of lock base 16 in the webbing pull-out direction is impeded. At this time, the webbing tensile force due to the inertial movement of the vehicle occupant acts as rotational force in the webbing pull-out direction on the torsion bar 24 via the spool 14. Thus, while the torsion bar 24 is twisted, the spool 14 rotates relatively with respect to the lock base 16.

Further, when the spool 14 begins to rotate relatively with respect to the lock base 16, the wire 28 is pulled out from the spool 14 while being drawn through (rubbed)at the exit portion of the spool 14, and is taken-up on the side surface of the lock base 16.

In this way, while the twisting load of the torsion bar 24 and the drawing-through (rubbed)load of the wire 28 are applied to the webbing 26 (the vehicle occupant) as a constant force limiter load, the spool 14 is rotated in the webbing pull-out direction with respect to the lock base 16, such that the webbing 26 is pulled-out and energy is absorbed.

Figure 3:
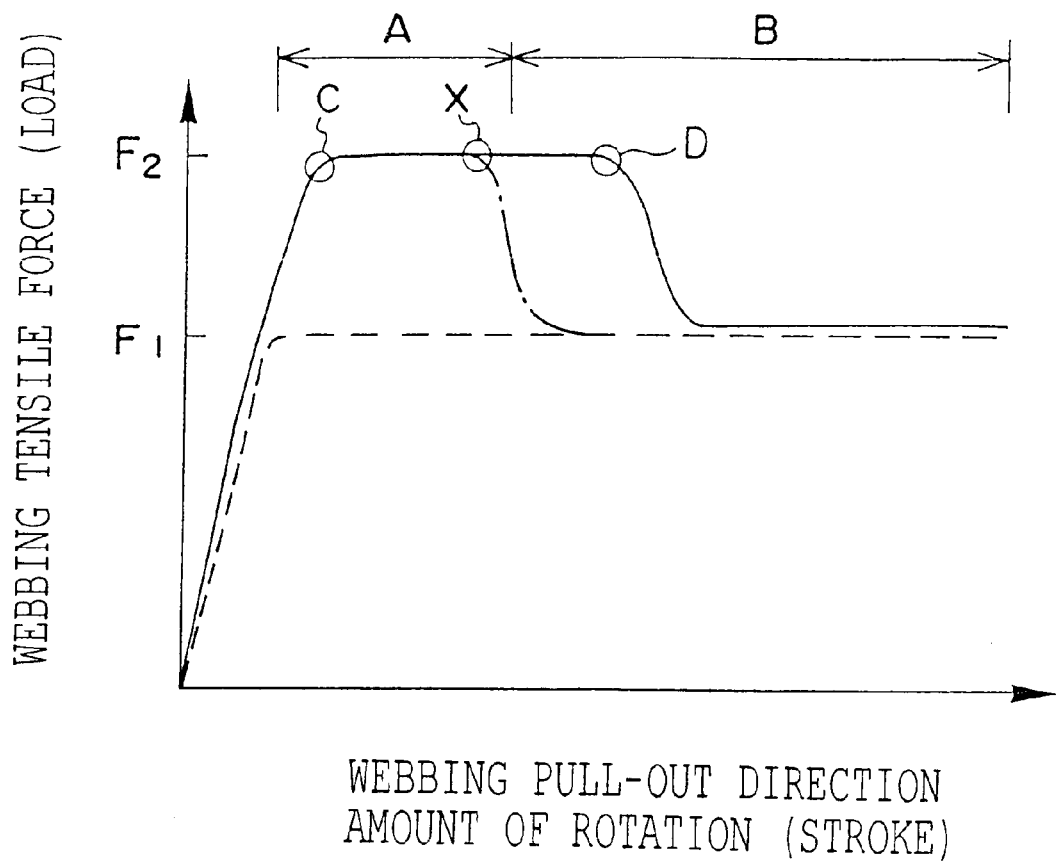
FIG. 3 is a graph showing a relationship between webbing tensile force (force limiter load) and an amount of rotation of a spool in a webbing pull-out direction, in the webbing take-up device relating to the embodiment of the present invention.

The webbing tensile force and the amount of rotation of the spool 14 at this time have the relation shown by the solid line in FIG. 3, and a predetermined force limiter load (F2 in FIG. 3) is applied to the webbing 26. Here, when the entire length of the wire 28 is pulled out from the spool 14 as the spool 14 rotates (the spool rotation amount D shown in FIG. 3), the drawing-through force of the wire 28 ceases to be applied, and a force limiter load F1 shown in FIG. 3 is applied. Note that if the wire 28 is made long with respect to the permitted amount of rotation of the spool 14, a force limiter load F2 shown in FIG. 3 can be maintained throughout the entire process of energy absorption.

When the control device 40 operates the gas supplying device 38 at an arbitrary time during the aforementioned energy absorbing process (i.e., at the time of the amount of rotation X of the spool shown in FIG. 3), gas is supplied to the interior of the cylinder 34 and the piston 36 is slid in the direction of arrow A in FIG. 2 due to the gas pressure. When the piston 36 is slid, the rack 36A provided at the piston 36 moves while meshing with the meshing teeth 30A of the cutting gear 30. In this way, the cutting gear 30 is forcibly rotated at high speed with respect to the spool 14 and the lock base 16.

The cutting gear 30 is provided in the state in which the wire 28 is inserted through the cutting hole 30B formed in the side surface of the cutting gear 30. Thus, when the cutting gear 30 rotates at high speed with respect to the spool 14 and the lock base 16, the wire 28 is cut by the cutting hole 30B provided at the cutting gear 30. In this way, only the twisting load of the torsion bar 24 acts on the webbing 26 as the force limiter load, and the force limiter load can be reduced at an arbitrary time.

The webbing tensile force and the amount of rotation of the spool 14 at this time have the relation shown by the one-dot chain line in FIG. 3. The force limiter load decreases from F2 to F1 as shown in FIG. 3 at an arbitrary time X.

Accordingly, at the initial stages of sudden deceleration of the vehicle, a large force limiter load is applied, and the energy absorption amount per amount of rotation of the spool 14 (i.e., per pull-out amount of the webbing 26) is made large. In this way, the amount of pull-out of the webbing 26 (the amount of movement of a vehicle occupant 70) can be suppressed (region A in FIG. 3). On the other hand, after a predetermined energy absorption, by decreasing the force limiter load, the load applied to the vehicle occupant 70 can be decreased (region B in FIG. 3).

Further, in a case in which the gas supplying device 38 is not operated, a large force limiter load is maintained throughout the entire energy absorption process. In a case in which the gas supplying device 38 is operated immediately after the vehicle rapidly decelerates (for example, at substantially the same time of beginning of the rapid deceleration of the vehicle), a low force limiter load can be applied from the initial stages of rapid vehicle deceleration. As a result, switching can be carried out between two different force limiter loads in accordance with the inertial energy of the vehicle occupant based on the physique of the vehicle occupant and on the type of the collision.

Figure 5:
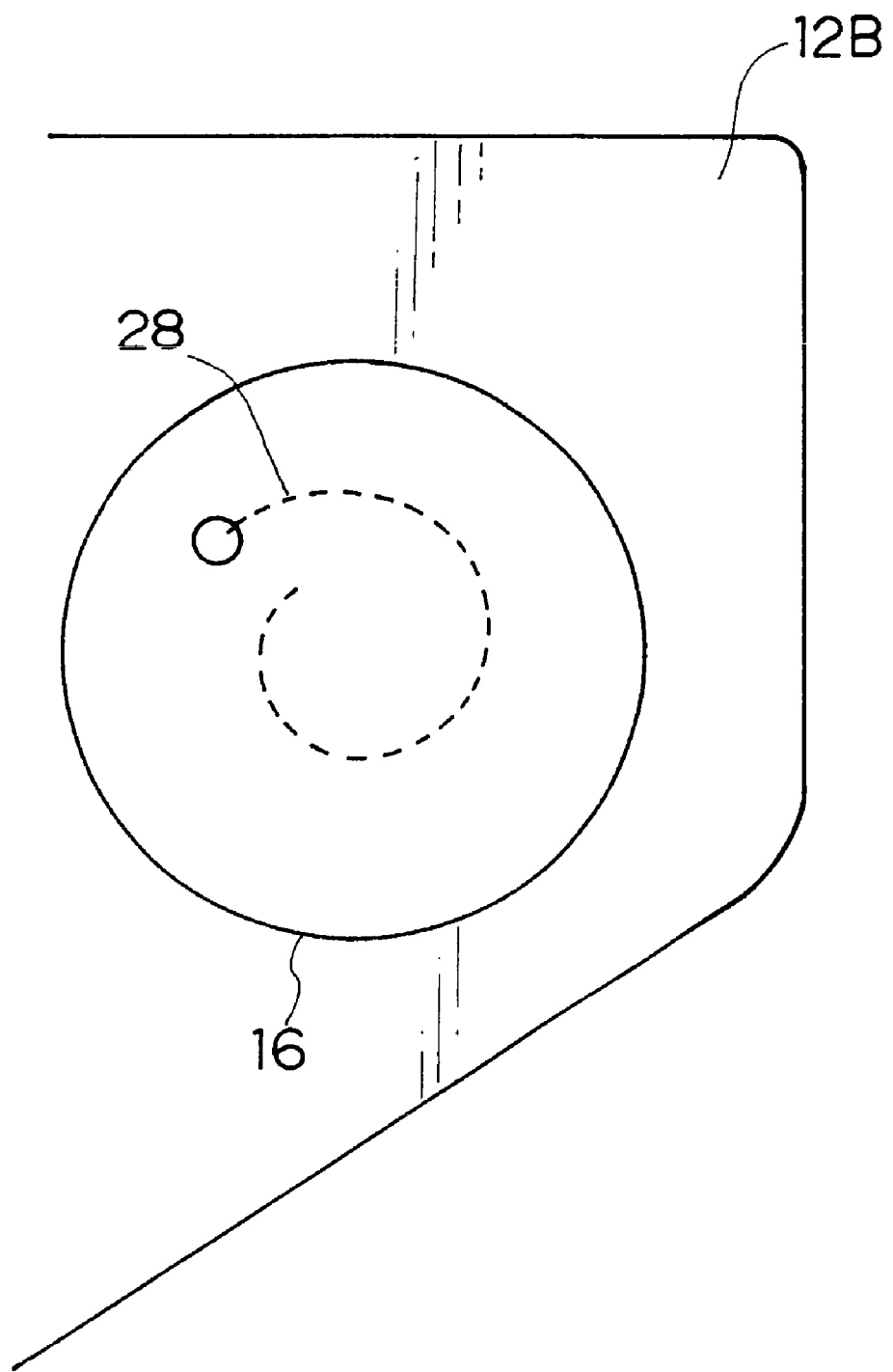
FIG. 5 is cross-sectional view showing another embodiment of a wire of the present invention.

In the above-described embodiment, the hole 14A provided in the spool 14 is rectilinear. However, the present invention is not limited to the same. For example, the hole 14A may be rectilinear along the axis of the spool 14, may be spiral with respect to the axis of the spool 14, or may be another curved form (FIG. 5).

Figure 6:
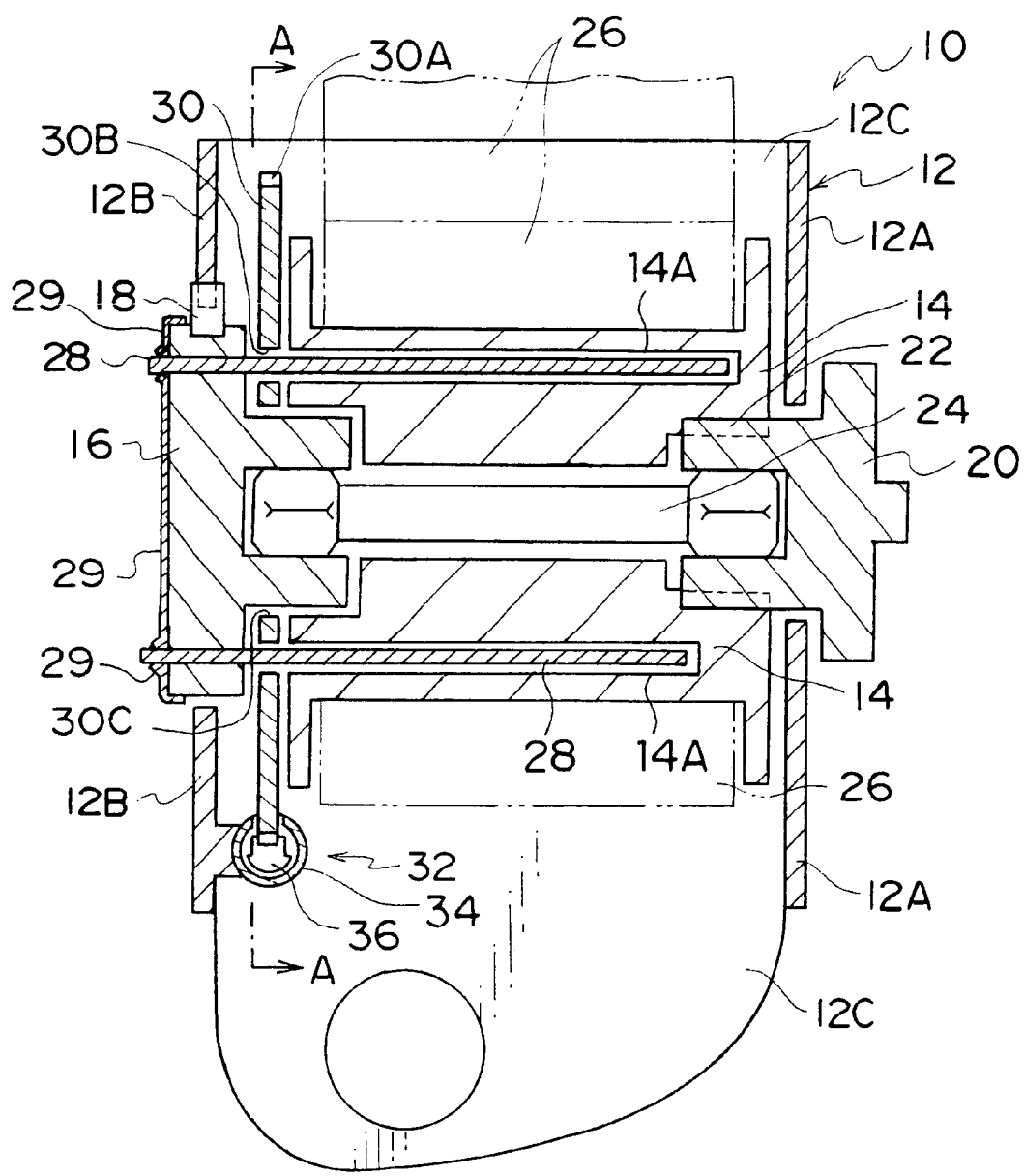
FIG. 6 is a view showing another embodiment of a wire of the present invention.

Further, in the above-described embodiment, one of each of the hole 14A, the wire 28 and the hole 30B are provided. However, the present invention is not limited to the same, and a plurality of each of the hole 14A, the wire 28 and the hole 30B may be provided (FIG. 6).

Moreover, although a rack and pinion structure is employed as the drive means in the embodiment described above, the present invention is not limited to the same. For example, a rollette may be used. Or, a second gear which is usually rotatable and which always meshes with the cutting gear 30 may be provided, and this second gear can transfer rotational force at an arbitrary time. Further, the drive source of the drive means is not limited to the gas supplying device, and for example, an electromagnetic actuator such as a solenoid, or a rotating machine such as a motor may be used.

In this way, in the webbing take-up device 10 relating to the present embodiment, different force limiter loads can be selected at arbitrary times, by use of a simple structure.

Next, a vehicle 50, which relates to another embodiment of the present invention and to which the webbing take-up device 10 of the above-described embodiment is applied, will be described with reference to FIG. 4.

In FIG. 4, the periphery of a front passenger's seat 52 of the vehicle 50 is illustrated in cross-section as an example of application of the webbing take-up device 10 to the vehicle 50.

The vehicle 50 is provided with the front passenger's seat 52, and the webbing take-up device 10 is applied to the front passenger's seat 52. Further, an air bag device 60 is disposed at an instrument panel 54 in front of the front passenger's seat 52. The air bag device 60 is operated at the time when a predetermined acceleration is sensed by an acceleration sensor (not shown in the drawings), so as to inflate a bag body 62 toward the vehicle occupant 70 who is seated in the front passenger's seat 52.

A sensor 64 is provided at the vehicle occupant 70 side distal end portion of the bag body 62, and detects the distance to the vehicle occupant 70. The sensor 64 is electrically connected to the control device 40, and outputs the results of detection to the control device 40.

As described above, the control device 40 is connected to the gas supplying device 38. When the control device 40 judges, on the basis of the results of detection of the sensor 64, that there is a state immediately before contact of the vehicle occupant 70 and the bag body 62, the control device 40 operates the gas supplying device 38.

Next, operation of the vehicle 50 to which the webbing take-up device 10 is applied will be described.

When the vehicle 50 rapidly decelerates, the lock plate 18 of the webbing take-up device 10 bites into the leg plate 12B, and rotation of the lock base 16 in the webbing pull-out direction is impeded. At this time, the upper portion of the body of the vehicle occupant 70 seated in the front passenger's seat 52 moves toward the front of the vehicle (in the direction of arrow A in FIG. 4) due to inertial force due to the rapid deceleration of the vehicle 50. When a tensile force is applied to the webbing as the vehicle occupant 70 moves, the twisting load of the torsion bar 24 and the drawing-through load of the wire 28 are applied to the vehicle occupant 70 as force limiter load in the direction of arrow F in FIG. 4, and the inertial energy of the vehicle occupant 70 is absorbed.

In a case in which the rapid deceleration of the vehicle 50 is even greater, the air bag device 60 is operated simultaneously with the absorption of energy by the webbing take-up device 10. When the air bag device 60 is operated, the sensor 64 detects the distance between the bag body 62 and the vehicle occupant 70, and outputs the results of detection to the control device 40. When the control device 40, to which the results of detection by the sensor 64 are input, judges, on the basis of these results of detection, that there is a state immediately before contact of the bag body 62 and the vehicle occupant 70, the control device 40 operates the gas supplying device 38.

When the gas supplying device 38 is operated, the wire 28 is cut, and the force limiter load decreases from F2 to F1 shown in FIG. 2.

In this way, because the force limiter load decreases immediately before contact of the bag body 62 and the vehicle occupant 70, at the time before contact of the bag body 62 and the vehicle occupant 70, a large force limiter load is applied, and the energy absorption amount per time is large, such that the webbing pull-out amount (amount of movement of the vehicle occupant) can be suppressed. On the other hand, after contact of the bag body 62 and the vehicle occupant 70, a smaller force limiter load is applied, such that the force applied to the vehicle occupant 70 from the exterior (i.e., the force limiter load and the load accompanying contact with the bag body 62) is decreased. In this way, there is less possibility that the vehicle occupant 70 is injured, compared to the conventional device.

The vehicle 50 may be provided, for example, with a sensor which can detect the physique (weight) of the vehicle occupant 70, such as a load sensor array or the like provided within the seat surface of the front passenger's seat 52. When the vehicle occupant 70 is of a large physique (when the inertial energy is large), a large force limiter load can be maintained even after collision (contact) with the bag body 62, without operating the gas supplying device 38. When the vehicle occupant 70 has a small physique (the inertial energy is low), the gas supplying device 38 can be operated before collision with the bag body 62 such that a small force limiter load is applied from the initial stages of energy absorption. Further, it is possible to use not only the physique of the vehicle occupant 70 but also, for example, the type of collision of the vehicle 50 (the deceleration amount at the time of rapid deceleration, or the direction thereof, or the like) as a parameter for judging the time for operating the gas supplying device 38.

In the above-described vehicle 50, the webbing take-up device 10 is applied to the front passenger's seat 52. However, the present invention is not limited to the same. For example, the webbing take-up device 10 may be applied to the driver's seat or a rear passenger's seat, and may be applied to a seat which is not equipped with an air bag device.

Moreover, in the above-described vehicle 50, the sensor 64 is provided at the distal end of the bag body 62. However, the present invention is not limited to the same, and for example, a sensor may be provided at a roof 56 of the vehicle 50 or at the steering wheel (in the case of the "driver's seat"). Further, instead of providing a sensor which directly detects, for example, the distance to the vehicle occupant, the weight of the vehicle occupant, the position of the seat, the type of collision, the take-up amount of the webbing, or the like may be inputted from sensors or the like which are already provided, and the control device 40 may be equipped with a program (an indirect sensor system) which can compute the time of collision between the bag body 62 and the vehicle occupant 70 on the basis of these inputs.

In this way, in a vehicle which is equipped with an air bag device and to which the webbing take-up device 10 of the above-described embodiment is applied, the load applied to a vehicle occupant can be reduced.

In the above description, the webbing take-up device relating to the present invention includes the cutting gear 30 and the like forming the cutting section and the control section 40. However, the present invention is not limited to the same. The webbing take-up device relating to the present invention may not include the cutting gear 30 and the like forming the cutting section and the control section 40. (Namely, in FIG. 1, the cutting gear driving device 32(34, 36) and cutting gear 30 may be omitted.) Even in this case, by adjusting the wire 28 to an adequate length, two different force limiter loads can be obtained. Namely, before the entire wire 28 is pulled out from the hole 14A, a large force limiter load is obtained, and after the entire wire 28 is pulled out from the hole 14A, a small force limiter load is obtained. Accordingly, the webbing take-up device in this case has the excellent effect that different force limiter loads can be obtained, with a very simple structure in which the device merely has the hole 14A and the wire 28 which is accommodated in the hole 14A, in a normal state.

As described above, the webbing take-up device relating to the present invention has the excellent effect that different force limiter loads can be selected at arbitrary times, with a simple structure.

Further, the vehicle relating to the present invention is provided with the above-described webbing take-up device and an air bag device, and has the excellent effect that the load applied to the vehicle occupant can be reduced.

What is claimed is:

1. A webbing take-up device comprising:
    a cylindrical spool at which a webbing is taken-up and from which a webbing is pulled-out;
    a lock base provided at one end side of the spool so as to be coaxial with the spool and so as to be able to rotate relatively to the spool;
    a locking member which is connected to the lock base and which impedes rotation of the lock base in a direction of pulling out the webbing by engaging with a frame at a time when a predetermined acceleration is sensed;
    a torsion bar coaxially provided with the spool, one end of the torsion bar being connected to the spool, another end of the torsion bar being connected to the lock base, such that when the locking member does not impede rotation of the lock base, the torsion bar causes the spool and the lock base to rotate integrally, and when the locking member impedes rotation of the lock base, the spool rotates relative to the lock base in a webbing pulling-out direction in response a webbing tensile force by twisting said torsion bar;

at least one wire whose one end portion is fixed to the lock base and whose other end portion and an intermediate portion are inserted in the spool, and due to the at least one wire being pulled out from the spool at a time when the spool rotates relatively with respect to the lock base, the at least one wire generating a resistance force; and a cutting section which is able to cut the at least one wire at an arbitrary time.

2. A webbing take-up device according to claim 1, wherein the cutting section has:

a cutting gear which is formed in a disc shape having meshing teeth at an outer peripheral portion thereof and which has a cutting hole in a disc side surface, the cutting gear being disposed between the spool and the lock base so as to be freely rotatable and so as to be coaxial with the spool, with the at least one wire inserted through the cutting hole; and a driving section having driving teeth which can mesh with the meshing teeth of the cutting gear, the driving section allowing the cutting gear to rotate freely in the normal state, and due to the drive means being operated, the drive teeth being moved while meshing with the meshing teeth of the cutting gear such that the driving section forcibly rotates the cutting gear with respect to the spool and the lock base.

3. A webbing take-up device according to claim 1, wherein the intermediate portion and the other end portion of the at least one wire are accommodated in a wire accommodating portion provided at the spool.

4. A webbing take-up device according to claim 3, wherein the wire accommodating portion is a hole which is substantially parallel to an axis of rotation of the spool.

5. A webbing take-up device according to claim 3, wherein the wire accommodating portion is formed in spiral shape with respect to an axis of rotation of the spool.

6. A webbing take-up device according to claim 3, wherein a plurality of the wires and a plurality of the wire accommodating portions are provided.

7. A webbing take-up device comprising:

a cylindrical spool at which a webbing is taken-up and from which a webbing is pulled-out;

a lock base provided at one end side of the spool so as to be coaxial with the spool and so as to be able to rotate relatively to the spool;

a locking member which is connected to the lock base and which impedes rotation of the lock base in a direction of pulling out the webbing by engaging with a frame at a time when a predetermined acceleration is sensed;

a torsion bar coaxially provided within the spool, one end of the torsion bar being connected to the spool, another end of the torsion bar being connected to the lock base, such that when the locking member does not impede rotation of the lock base, the torsion bar causes the spool and the lock base to rotate integrally, and when the locking member impedes rotation of the lock base, the spool rotates relative to the lock base in a webbing pulling-out direction in response a webbing tensile force by twisting said torsion bar;

at least one wire whose one end portion is fixed to the lock base and whose other end portion and an intermediate portion are inserted in the spool, and due to the at least one wire being pulled out from the spool at a time when the spool rotates relatively with respect to the lock base, the at least one wire generating a resistance force; and a cutting section which is able to cut the at least one wire at an arbitrary time, wherein the cutting section has:

a cutting gear which is formed in a disc shape having meshing teeth at an outer peripheral portion thereof and which has a cutting hole in a disc side surface, the cutting gear being disposed between the spool and the lock base so as to be freely rotatable and so as to be coaxial with the spool, with the at least one wire inserted through the cutting hole; and a driving section having driving teeth which can mesh with the meshing teeth of the cutting gear, the driving section allowing the cutting gear to rotate freely in the normal state, and due to the drive means being operated, the drive teeth being moved while meshing with the meshing teeth of the cutting gear such that the driving section forcibly rotates the cutting gear with respect to the spool and the lock base.

8. A vehicle comprising:

a webbing take-up device having:

a cylindrical spool at which a webbing is taken-up and from which a webbing is pulled-out;

a lock base provided at one end side of the spool so as to be coaxial with the spool and so as to be able to rotate relatively to the spool;

a locking member which is connected to the lock base and which impedes rotation of the lock base in a direction of pulling out the webbing by engaging with a frame at a time when a predetermined acceleration is sensed;

a torsion bar coaxially provided within the spool, one end of the torsion bar being connected to the spool, another end of the torsion bar being connected to the lock base, such that when the locking member does not impede rotation of the lock base, the torsion bar causes the spool and the lock base to rotate integrally, and when the locking member impedes rotation of the lock base, the spool rotates relative to the lock base in a webbing pulling-out direction in response a webbing tensile force by twisting said torsion bar;

at least one wire whose one end portion is fixed to the lock base and whose other end portion and an intermediate portion are inserted in the spool, the at least one wire being pulled out from the spool at a time when the spool rotates relatively with respect to the lock base, the at least one wire generating a resistance force; and a cutting section which is able to cut the at least one wire at an arbitrary time;

an air bag device;

a sensor which can detect information relating to at least one of a vehicle occupant and a state of the vehicle; and a control section which is connected to the cutting section on the basis of detection result of the sensor.

9. A vehicle according to claim 8, wherein the sensor is a sensor which can detect a distance between the vehicle occupant and a bag body of the air bag device.

10. A vehicle according to claim 8, wherein the sensor is a sensor which can detect at least one of a weight of the vehicle occupant and a physique of the vehicle occupant.

11. A vehicle according to claim 8, wherein the sensor can detect a running state of the vehicle.

* * * * *